(12) United States Patent
Mikami et al.

(10) Patent No.: US 6,492,940 B2
(45) Date of Patent: Dec. 10, 2002

(54) METHOD OF AND SYSTEM FOR RECEIVING MICROWAVE

(75) Inventors: Izumi Mikami, Tokyo (JP); Yoshihiko Konishi, Tokyo (JP); Kazuyuki Takada, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/871,898

(22) Filed: Jun. 4, 2001

(65) Prior Publication Data

US 2002/0030624 A1 Mar. 14, 2002

(30) Foreign Application Priority Data

Sep. 14, 2000 (JP) .......................................... 2000-279784

(51) Int. Cl.$^7$ ............................................... H04B 7/185
(52) U.S. Cl. ....................................................... 342/354
(58) Field of Search ................................ 342/154, 354, 342/357.15, 372

(56) References Cited

U.S. PATENT DOCUMENTS

| | | | | |
|---|---|---|---|---|
| 3,781,647 A | * | 12/1973 | Glaser | 322/2 |
| 4,364,532 A | * | 12/1982 | Stark | 244/30 |
| 4,368,415 A | * | 1/1983 | Henderson et al. | 322/2 R |
| 5,019,768 A | * | 5/1991 | Criswell et al. | 322/2 R |
| 6,023,242 A | * | 2/2000 | Dixon | 342/359 |

\* cited by examiner

*Primary Examiner*—Dao Phan
(74) *Attorney, Agent, or Firm*—Oblon, Spivak, McClelland, Maier & Neustadt, P.C.

(57) ABSTRACT

A method of and a system for receiving microwave beams from a plurality of power satellites (1) in space by way of a receiving antenna (3). By controlling the directions of a plurality of microwave beams to be transmitted from the plurality of power satellites, the plurality of power satellites (1) direct the plurality of microwave beams into an aperture surface of the receiving antenna (3), respectively, so that the plurality of microwave beams can be dispersively received at a number of different positions on the aperture surface of the receiving antenna (3), so as to level the energy distribution of the microwaves received on the aperture surface of the receiving antenna (3).

13 Claims, 3 Drawing Sheets

METHOD OF AND SYSTEM FOR RECEIVING MICROWAVE

BACKGROUND OF THE INVENTION

1. Field of the Invention

The present invention relates to a space photovoltaic power generation method of receiving sunlight in space so as to generate electric power, for transmitting the electric power via space by converting the electric power to microwaves, and for receiving the microwaves on the earth so as to allow the use of the electric power. More particularly, it relates to a method of and a system for receiving the microwaves.

2. Description of the Prior Art

With an increase in the demand for electrical energy in recent years and attaching importance on environmental issues as a background, the development of clean, safe, and stable power supply equipment is an urgent necessity. Attention has been focused on the idea of space photovoltaic power generation systems according to such a request, and the research and development has been conducted actively. Space photovoltaic power generation systems receive sunlight in space, generate electric power, and transmit the electric power to a specific place, for instance, a specific location on the earth or in space.

As an example of space photovoltaic power generation systems, a method of placing a plurality of geostationary power satellites in predetermined different positions in space, converting (photoelectric-converting) sunlight into electric power in each of the plurality of power satellites, and transmitting the electric power to a receiving antenna disposed in a specific location on the earth by converting the electric power into microwaves is under review.

The reason why instead of the plurality of power satellites, a single power satellite into which they are integrated is not provided is causing very upsizing of the power satellite and the impracticality from respect of implementation and reliability. In the case of sharing power generation among a plurality of power satellites, when the generating capacity is assumed to be equal to one million kW (corresponding to that of currently-functioning nuclear power plants), for example, about several hundreds of power satellites are needed. A microwave transmitted to the ground is spread over a range wide so that its energy density becomes small in consideration of safety (the energy density has to fall within the legal limit). An electric power base located on the earth includes a number of receiving antennas arranged in an area of several tens of square kilometers, receives incident microwaves by means of these receiving antennas, and integrates the received microwaves into high electric power.

In accordance with the method of receiving microwaves which above-mentioned prior art space photovoltaic power generation systems employ, a microwave beam from each of a plurality of power satellites arranged in space is concentrated onto a receiving antenna located on the earth. A problem with the microwave receiving method is therefore that if a plurality of microwaves from the plurality of power satellites are transmitted to the same region of the receiving antenna, the energy density of the microwaves incident on the region locally exceeds a legal limit because of the interference of microwaves as electromagnetic waves, even if the energy density of an individual microwave is small. Furthermore, another problem is that there is a need to increase the resistance of the receiving antenna to electric power since the energy of microwaves is concentrated onto part of the receiving antenna.

SUMMARY OF THE INVENTION

The present invention is proposed to solve the above-mentioned problems, and it is therefore an object of the present invention to provide a method of and a system for receiving microwaves, capable of dispersively directing a plurality of microwave beams transmitted from a plurality of power satellites into different positions on a receiving antenna without concentrating a plurality of microwave beams from the plurality of power satellites onto the same region of the receiving antenna, so as to level the energy distribution of microwaves on the aperture surface of the receiving antenna.

In accordance with one aspect of the present invention, there is provided a method of receiving microwave beams from a plurality of power satellites in space by way of a receiving antenna, the method comprising the step of: by controlling a direction of each of a plurality of microwave beams to be transmitted from the plurality of power satellites, directing the plurality of microwave beams into an aperture surface of the receiving antenna so that the plurality of microwave beams are dispersively received at a number of different positions on the aperture surface of the receiving antenna, so as to level energy distribution of the microwaves received on the aperture surface of the receiving antenna.

In accordance with a preferred embodiment of the present invention, the method further comprises the steps of virtually defining a plurality of small regions on the aperture surface of the receiving antenna as the plurality of different positions, and controlling the direction of each of the plurality of microwave beams to be transmitted so that the plurality of microwave beams are directed into the plurality of small regions, respectively.

In accordance with another aspect of the present invention, there is provided a microwave receiving system comprising: a plurality of power satellites each for transmitting a microwave beam; a receiving antenna for receiving a plurality of microwave beams from the plurality of power satellites; and a control unit for controlling the plurality of power satellites so that the plurality of microwave beams are dispersively directed into a number of predetermined different positions on an aperture surface of the receiving antenna.

In accordance with a preferred embodiment of the present invention, the control unit controls the plurality of power satellites so that the microwave beam from each of the plurality of power satellites is directed into a corresponding one of the plurality of predetermined different positions on the aperture surface of the receiving antenna.

In accordance with another preferred embodiment of the present invention, the plurality of predetermined different positions are arranged uniformly on the aperture surface of the receiving antenna.

In accordance with a further preferred embodiment of the present invention, the control unit controls the direction of each of the plurality of microwave beams to be transmitted from the plurality of power satellites based on information on the plurality of predetermined different positions on the aperture surface of the receiving antenna.

In accordance with another preferred embodiment of the present invention, the control unit includes a location information transmission unit for transmitting the information on the plurality of predetermined different positions on the aperture surface of the receiving antenna, and a beam direction control unit for controlling the direction of each of the plurality of microwave beams to be transmitted from the plurality of power satellites based on the information transmitted by the location information transmission unit.

Preferably, the plurality of predetermined different positions are a plurality of small regions that are virtually defined on the aperture surface of the receiving antenna. In addition, the control unit can control the plurality of power satellites so that the microwave beam from each of the plurality of power satellites is directed into a corresponding one of the plurality of small regions on the aperture surface of the receiving antenna.

In accordance with a further preferred embodiment of the present invention, the control unit controls each of the plurality of power satellites so that the microwave beam from each of the plurality of power satellites is directed into a different one of the plurality of small regions on the aperture surface of the receiving antenna.

In accordance with another preferred embodiment of the present invention, a number of the plurality of power satellites is equal to a number of the plurality of small regions, and the control unit controls each of the plurality of power satellites so that the microwave from each of the plurality of power satellites is directed into a different one of the plurality of small regions on the aperture surface of the receiving antenna.

In accordance with a further preferred embodiment of the present invention, the plurality of power satellites is divided into a number of groups, and a number of the plurality of groups is equal to a number of the plurality of small regions. In addition, the control unit can control each of the plurality of power satellites so that a microwave beam from each of the plurality of groups is directed into a different one of the plurality of small regions on the aperture surface of the receiving antenna.

In accordance with another preferred embodiment of the present invention, the plurality of small regions include a plurality of first small regions into which the aperture surface is divided so that they do not overlap one another, and a plurality of second small regions which do not overlap one another and each of which is located at a boundary between first small regions adjacent to each other.

Preferably, the receiving antenna is an array antenna including a plurality of antenna elements arranged in a form of an array.

Further objects and advantages of the present invention will be apparent from the following description of the preferred embodiments of the invention as illustrated in the accompanying drawings.

DETAILED DESCRIPTION OF THE PREFERRED EMBODIMENT

Figure 1:
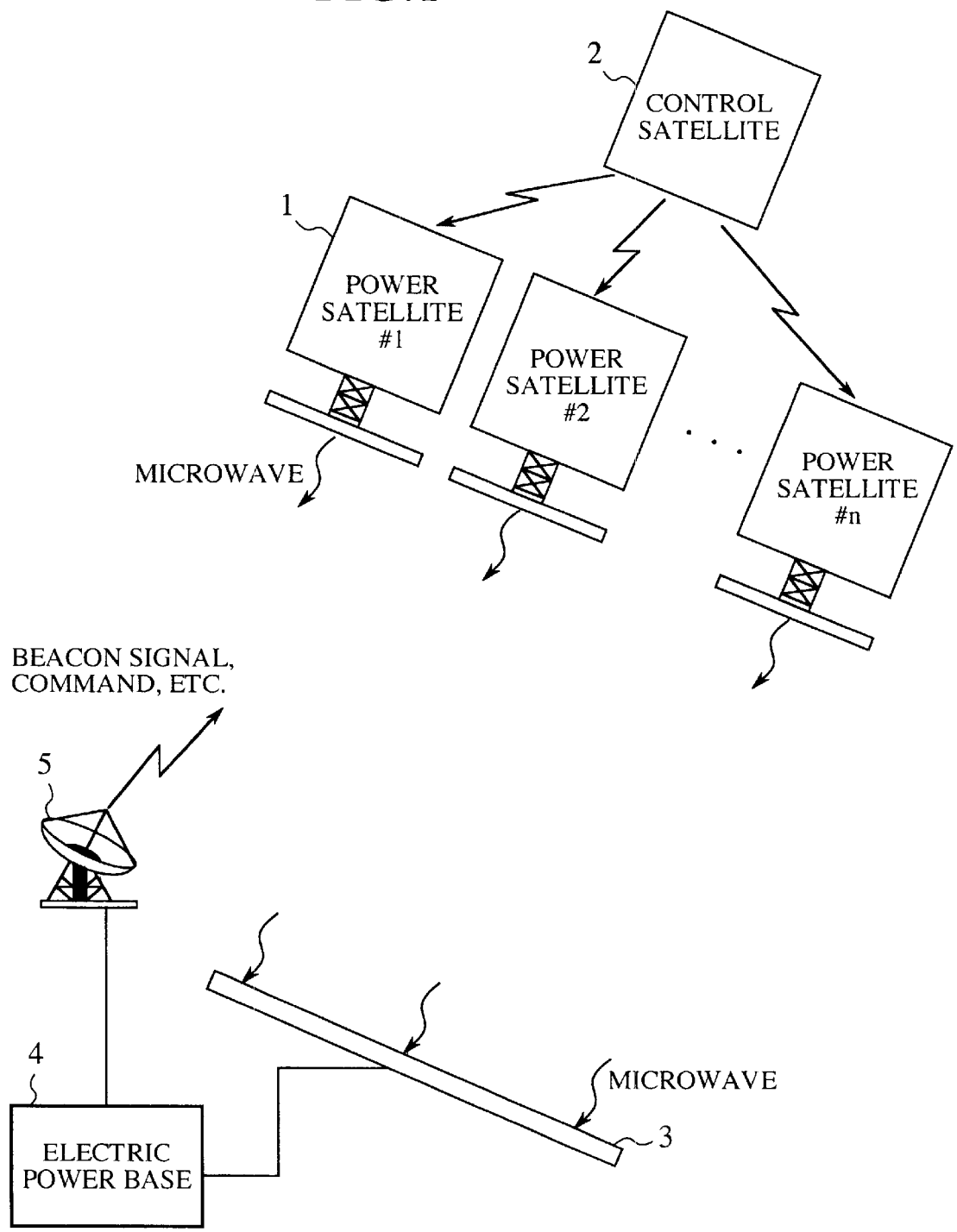
FIG. 1 is a diagram showing the structure of equipment used for a space photovoltaic power generation method and system according to one embodiment of the present invention.
Figure 2:
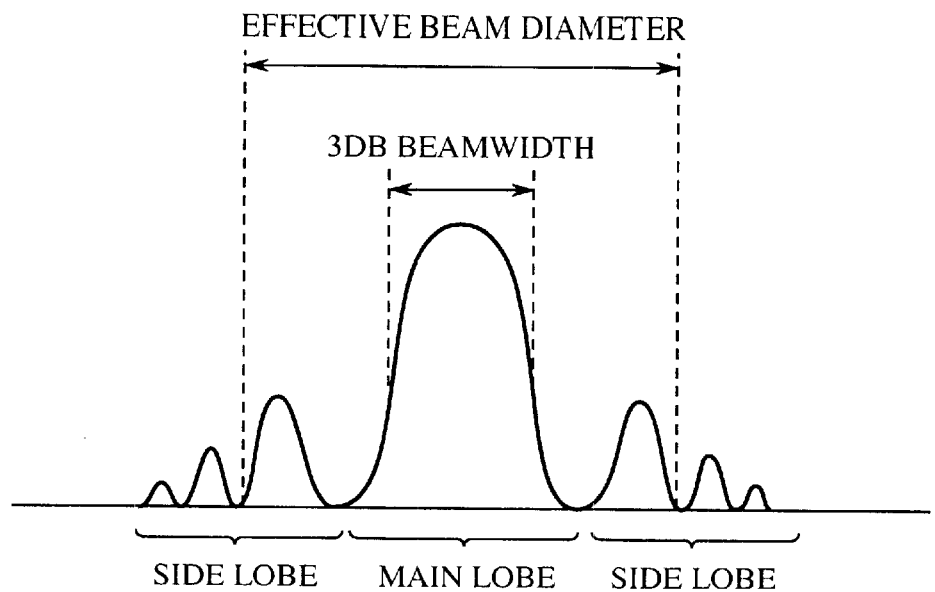
FIG. 2 is a drawing for explaining a principle underlying a method of receiving microwaves according to the embodiment of the present invention, and for showing a relationship among a beamwidth, an effective beam diameter, and the size of an aperture of each of a plurality of partial rectennas.
Figure 3:
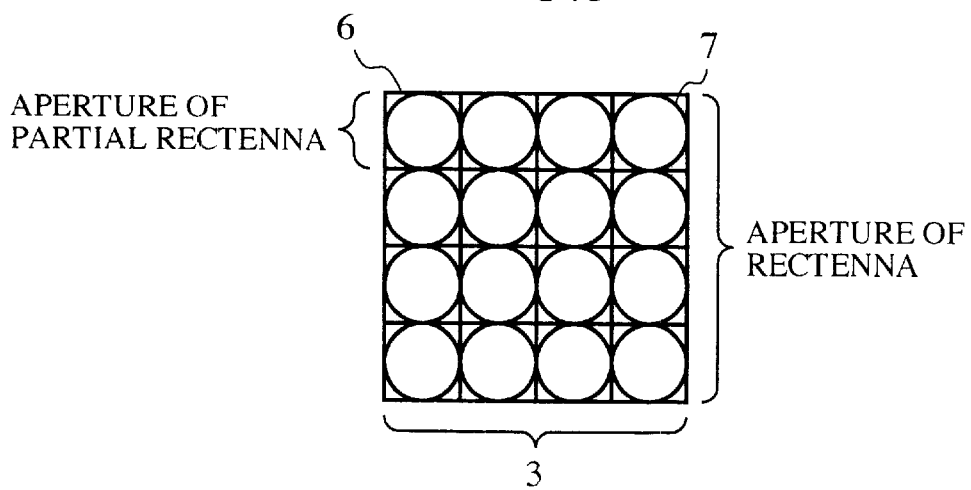
FIG. 3 is a drawing for explaining the principle underlying the method of receiving microwaves according to the embodiment of the present invention, and for explaining a method of arranging microwave beams and the plurality of partial rectennas.
Figure 4:
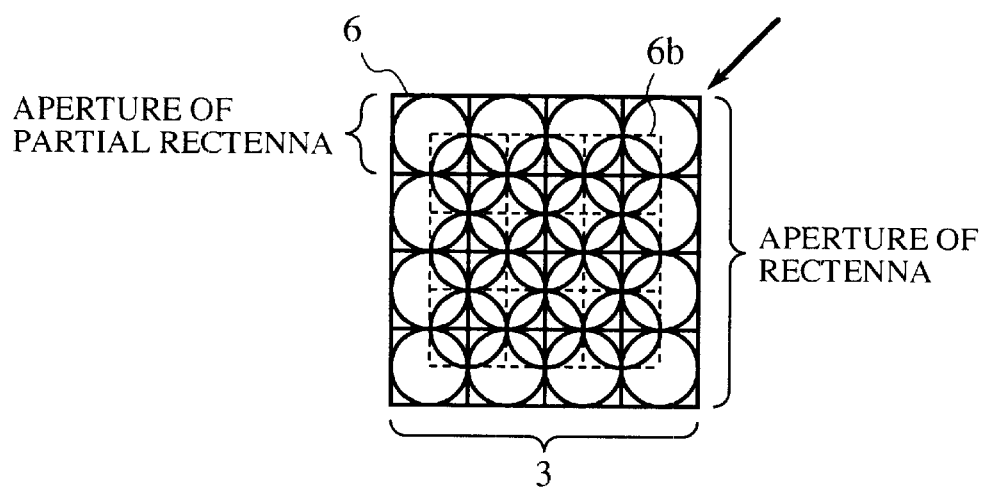
FIG. 4 is a drawing for explaining the principle underlying the method of receiving microwaves according to the embodiment of the present invention, and for explaining another method of arranging microwave beams and the plurality of partial rectennas.
Figure 5:
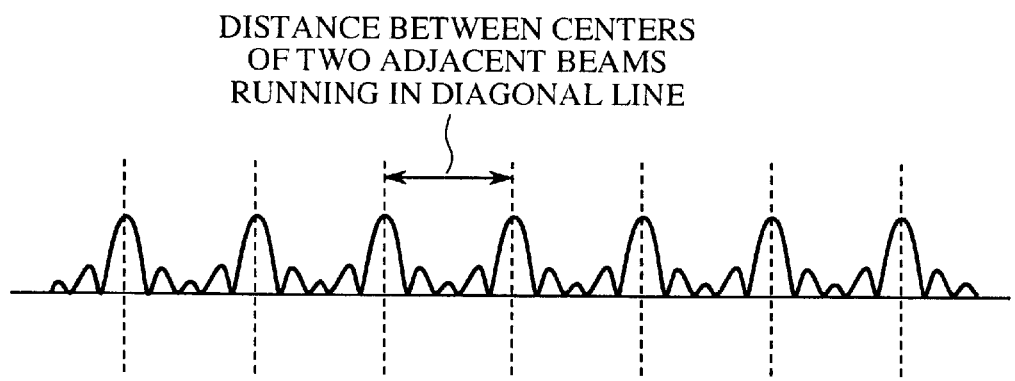
FIG. 5 is a drawing for explaining an energy distribution on a receiving antenna in accordance with the method of receiving microwaves according to the embodiment of the present invention.

A description will be made as to a method of and a system for receiving microwaves according to an embodiment of the present invention with reference to the accompanying drawings. FIG. 1 is a diagram showing the structure of equipment used for a space photovoltaic power generation method and system according to the embodiment. FIGS. 2, 3 and 4 are drawings for showing the principle underlying the microwave receiving method according to the embodiment of the present invention. FIG. 5 is a drawing for explaining energy distribution on a receiving antenna according to the microwave receiving method of the present embodiment.

In FIG. 1, reference numeral 1 denotes a power satellite for generating electrical energy from sunlight received in space, for generating a microwave from the electrical energy, and for transmitting the microwave. As shown in the figure, the space photovoltaic power generation system is provided with a plurality of power satellites #1 to #n. Reference numeral 2 denotes a control satellite for controlling the direction of a microwave beam which each of the plurality of power satellites 1 will transmit, and numeral 3 denotes a receiving antenna (also called "rectenna" which will be used from here on as a word synonymous with the receiving antenna) disposed in an electric power base 4, for receiving microwaves from the plurality of power satellites 1. The electric power base 4 generates electric power from the received microwaves. Reference numeral 5 denotes a satellite communications antenna disposed for allowing communication between the electric power base 4 and the control satellite 2.

Each of the plurality of power satellites 1 further converts electrical energy, into which sunlight has been photoelectric-converted, into a microwave, and transmits the microwave to the electric power base 4. The electric power of the microwave that each of the plurality of power satellites 1 can transmit is determined by the sunlight focusing capability, the photoelectric-conversion capability, and the microwave amplification capability of each of the plurality of power satellites 1. The arrangement of the plurality of power satellites 1 in space makes it possible to transmit a microwave of high power to the electric power base 4. The microwave receiving system according to the present invention controls the direction of the microwave beam which each of the plurality of power satellites 1 will individually transmit and receives the microwave at a different position on the aperture surface of the rectenna so as to level the energy distribution of microwaves received on the aperture surface of the rectenna. The microwave receiving system according to the present invention then receives microwave beams transmitted from the plurality of power satellites 1 by way of the rectenna 3, and converts the microwave beams received into a low-frequency wave which can be used as electric power by means of the electric power base 4.

The electric power base 4 can be placed on the earth. As an alternative, the electric power base 4 can be placed in such a location in space as a location of the surface of the moon, a space plant facility, or the like. When the electric power base 4 is located on the earth, it is necessary to reduce the energy density (energy per unit area) of microwaves transmitted from the plurality of power satellites from the viewpoint of the flora and fauna environment and electric wave trouble. Therefore, the rectenna 3 can have an area ranging from several tens of square kilometers to several hundreds of square kilometers. In general, such a huge antenna can be formed by arranging a number of antenna elements each having a specific size in the form of an array, for example. In this case, the electric power base 4 has a function of combining either microwaves received via the plurality of antenna elements or microwaves from a number of antenna groups in addition to a function of converting the composite microwave into a low-frequency wave.

In addition, the electric power base 4 includes the satellite communications antenna 5 as shown in FIG. 1. The satellite communications antenna 5 sends a beacon signal to the control satellite 2. The control satellite 2 can recognize the direction in which the microwave beam is to be transmitted from each of the plurality of power satellites 1 by catching the beacon signal. The control satellite 2 controls the direction of the microwave beam transmitted from each of the plurality of power satellites 1 so that the microwave from each of the plurality of power satellites 1 is transmitted in the direction.

Next, the basic principle behind the method of receiving microwaves of the present invention will be explained. The microwave receiving method according to the present invention makes it possible to receive microwave beams independently sent from the plurality of power satellites while making the microwave beams, which are electromagnetic waves, not interfere with one another on the rectenna. To this end, in accordance with the method, the aperture surface of the rectenna is divided into a plurality of small virtual receive regions, each of which will be referred to as "partial rectenna", and each of which independently receives a corresponding microwave beam. The entire rectenna can thus consist of a set of partial rectennas arranged longitudinally and latitudinally. In addition, in accordance with the method, the microwave sent from each of the plurality of power satellites is controlled so that it is incoherent (i.e., the phase of the microwave has no correlation to that of another microwave sent from any other power satellite). The arrangement thus makes it possible to make the microwave beams received not interfere with one another on the rectenna, thereby preventing a local increase in the energy density. Furthermore, the amount of energy received by the entire rectenna is a simple sum of the energies of the microwaves received by the plurality of partial rectennas.

Next, each of the plurality of partial rectennas will be explained in detail. Each of the plurality of partial rectennas has to have a size only to receive a microwave beam with a certain divergence. The spacial distribution of the energy of the microwave transmitted from each of the plurality of power satellites 1 is not uniform but varies like waves in cross section because the aperture of a transmission antenna of each of the plurality of power satellites 1 is limited. The variation appears as both a main lobe located at the beam center and side lobes which are adjacent to the main lobe. For example, when the transmission antenna has a rectangular aperture, the energy of the microwave beam has a spacial distribution shown by the following function: $(\sin X/X)^2$, where X is a function of the emission angle of the microwave beam).

In order for each of the plurality of partial rectennas to efficiently receive the energy of a corresponding microwave beam, the aperture of each of the plurality of partial rectennas has to have a size that can cover not only the main lobe of the microwave beam but also some side lobes of the microwave beam (i.e., a size several times the beamwidth of the microwave beam) In the case of the above-mentioned example (in the case where the transmission antenna of each of the plurality of power satellites has a rectangular aperture), each of the plurality of partial rectennas has to have an aperture which can receive at least the main lobe and the first and second side lobes of the corresponding microwave beam to make each of the plurality of partial rectennas effectively receive the microwave beam. Concretely, in the case of the microwave beam having a spacial distribution shown by $(\sin X/X)^2$ as mentioned above, to cover the main lobe and the first and second side lobes of the microwave beam, each of the plurality of partial rectennas has to have an aperture whose size is fives times the 3 db beamwidth, which is measured in cross-sectional direction between two points of energy half the peak energy of the main lobe). When the diameter of the cross-sectional area of the microwave beam onto which the energy of the microwave beam concentrates is defined as "effective beam diameter", the partial rectenna aperture has to have a size larger than the effective beam diameter. FIG. 2 shows a relationship among the 3 db beamwidth, the effective beam diameter, and the size of the aperture of each of the plurality of partial rectennas. When the transmission antenna of each of the plurality of power satellites 1 has a square aperture, since the cross-sectional shape of a microwave beam transmitted from each of the plurality of power satellites is a circle, each of the plurality of partial rectennas only has to have a square aperture that can cover the microwave beam circular in cross section. Actually, each of the plurality of partial rectennas has an aperture whose size is of the order of several km. Based on the above-mentioned basic idea, the aperture of each of the plurality of partial rectennas can be determined.

Next, the rectenna that consists of a set of partial rectennas, will be explained in detail. FIG. 3 is a drawing showing microwave beams directed into the rectenna 3 and an example of the arrangement of the plurality of partial rectennas. The example of FIG. 3 shows the case where the number of microwave beams incident on the rectenna is 16. As shown in the figure, the aperture surface of the rectenna 3 is divided into the plurality of square partial rectennas 6, each of which is virtually defined as a small region for receiving a corresponding microwave beam 7. Each of the plurality of partial rectennas 6 has a size enough to effectively receive the energy of the corresponding microwave beam 7 from a corresponding one of the plurality of power satellites. Each of the plurality of microwave beams 7 has a circular shape in cross section and is directed into the center of the corresponding partial rectenna 6. The diameter of each of the plurality of circles shown in FIG. 3 is equal to "effective beam diameter", and most of the energy of the corresponding microwave beam is concentrated onto each of the plurality of circles. For simplicity, assume that the cross sectional shape of each of the plurality of microwave beams received is a circle, and the shape of the aperture of each of the plurality of partial rectennas is a square which can cover a corresponding one of the plurality of microwave beams. Furthermore, assume that the shape of the aperture of the rectenna 3 is a square in which the plurality of partial rectennas 6 are arranged longitudinally and latitudinally like a checkerboard so that the same number of partial rectennas are running not only in a row but also in a column (i.e., the plurality of partial rectennas 6 are arranged in the form of a 4×4 array). The plurality of partial rectennas do not overlap one another and are arranged in the same plane, as shown in FIG. 3. The arrangement of the plurality of partial rectennas 6 makes it possible to dispersively receive the plurality of microwave beams at the plurality of different positions on the rectenna so as to level the energy distribution of the received microwaves. Actually, the microwave receiving system controls the direction of the microwave beam to be transmitted from each of the plurality of power satellites 1 so that the center in cross section of the microwave beam is directed into the center of a corresponding one of the plurality of partial rectennas.

As previously mentioned, the aperture surface of the rectenna 3 includes the plurality of partial rectennas 6 that are virtually disposed as a plurality of small regions arranged longitudinally and latitudinally for receiving microwave beams. The rectenna 3 constructed as above has the aperture of the order from tens of km to hundreds of km. In general, the rectenna 3 consists of an array antenna in which a plurality of antenna elements are arranged in the form of an array. Actually, the shape of the aperture of the rectenna 3 is properly determined by the arrangement of the plurality of antenna elements which is designed based on antenna performance and the geographical features of a place where the rectenna 3 is set up, etc. In general, the shape of the aperture of the rectenna 3 is a circle, as shown in FIG. 3, or a rectangle.

The size of each of the plurality of partial rectennas 6 is determined, as mentioned above, according to the effective beam diameter of a corresponding microwave to be received. When reduction in the interference of microwaves as electromagnetic waves is paramount, though it is necessary to enlarge the aperture of each of the plurality of partial rectennas so that it is sufficiently larger than the effective beam diameter, the entire rectenna also becomes proportionally huge and the implementation of the rectenna therefore becomes difficult. Actually, the size of each of the plurality of partial rectennas can be determined in view of a trade-off between an acceptable degree of the interference of microwaves and so on, and the size of the entire rectenna.

As previously explained, each of the plurality of power satellites 1 generates an incoherent microwave and a plurality of microwave beams transmitted from the plurality of power satellites are independent of one another. Thus, the number of microwave beams generated is equal to the number of power satellites 1. As an alternative, the plurality of power satellite 1 can be divided into some groups, and each of a plurality of microwaves transmitted from each of the plurality of groups is phase-adjusted and incoherent-modulated so that it is coherent-transmitted to the electric power base and does not interfere with other microwaves transmitted from any other group. In the variant, it can be assumed that the plurality of power satellites included in each group form a transmission antenna of a large aperture, and generate a very narrow microwave beam by way of the large-aperture antenna (the beamwidth is proportional to the reciprocal of the size of the antenna aperture). Furthermore, the number of generated microwaves beams can be reduced because it is equal to the number of groups. As a result, the size of each of the plurality of partial rectennas can be reduced, and the number of partial rectennas can be reduced, resulting in a reduction in the size of the entire rectenna.

Furthermore, the beam shape in cross section can be changed into another shape, such as an ellipse, according to the shape of the aperture of the transmission antenna of each of the plurality of power satellites though it is assumed that the beam shape in cross section to be a circle in the above-mentioned explanation. In this case, the shape of each of the plurality of partial rectennas needs not also to be a square, and it is needless to say that it is preferable that the shape is matched to the beam shape.

As previously explained, the plurality of partial rectennas do not overlap one another and are arranged in the same plane. Though the arrangement is effective in reducing the interference of received microwaves as electromagnetic waves, the same number of partial rectennas as the number of microwave beams are needed and the entire rectenna therefore increases in size. FIG. 4 is a drawing for explaining another method of arranging the plurality of partial rectennas on the aperture surface of the rectenna to solve the above-mentioned problem. In accordance with the other method, a second partial rectenna is further located at the center of each of a plurality of sets of four first partial rectennas adjacent to each other, and a plurality of second partial rectennas are thus arranged so that they are overlaid on the plurality of first partial rectennas like a pyramid. In other words, the plurality of second partial rectennas are respectively arranged at a plurality of grids of the checkerboard where the plurality of first partial rectennas are arranged in the same plane. Since the distance between any two adjacent beams running in a diagonal direction is larger than that between any two adjacent beams running in a horizontal or vertical direction and the interference of two microwaves received by any two adjacent beams running in a diagonal direction is relatively small, each of the plurality of second partial rectennas can be located at the center of each of the plurality of sets of four first partial rectennas adjacent to each other. While the above-mentioned arrangement method of arranging the plurality of partial rectennas in the same plane, as shown in FIG. 3, makes it possible to dispersively receive at most 16 microwave beams at the plurality of different positions on the rectenna, the other arrangement method, as shown in FIG. 4, of arranging the plurality of first and second partial rectennas like a pyramid makes it possible to dispersively receive 25 microwave beams (=16 beams received by the plurality of first partial rectennas +9 beams received by the plurality of second partial rectennas) at the plurality of different positions on the aperture surface of the same size of the rectenna. FIG. 5 shows a part of the energy distribution of microwaves received by the aperture surface of the rectenna of FIG. 4 (in a line shown by the arrow of FIG. 4). Since the main lobe of each microwave beam does not interfere with that of any adjacent microwave beam, the peak of the electric power of each microwave beam can be prevented from exceeding a predetermined value.

Next, a method of controlling the direction of the microwave beam to be transmitted from each of the plurality of power satellites 1 will be explained. The direction of the microwave beam is controlled based on information on the location of each of the plurality of partial rectennas (e.g., information on the location of the center of each of the plurality of partial rectennas). The satellite communications antenna 5 located on the ground transmits a beacon signal as the above-mentioned location information to the control satellite 2. The control satellite 2 generates direction control data for each of the plurality of power satellites 1 by properly processing the above-mentioned location information, and sends the direction control data to each of the plurality of power satellites 1. Each of the plurality of power satellites 1 controls the direction of the microwave beam by using the direction control data from the control satellite 2. Instead of transmitting the direction control data to each of the plurality of power satellites 1 by means of the control satellite 2, it is possible to transmit the location information directly to each of the plurality of power satellites 1 so as to make it possible for each of the plurality of power satellites 1 to control the direction of the microwave beam. The control satellite can determine which piece of location information each of the plurality of power satellites will use (i.e., a correspondence between the plurality of power satellites and a plurality of pieces of location information). As an alternative, a device (e.g., the electric power base 4) located on the ground can determine which piece of location information each of the plurality of power satellites will use. When a device located on the ground determines which piece of location information each of the plurality of power satellites will use, the device attaches a flag showing which power satellite is associated with location information to be transmitted to the location information. When each of the plurality of power satellites receives location information with a flag showing that the destination is itself, it controls the direction of the microwave beam to be transmitted based on the information.

As previously mentioned, in accordance with the present invention, there is provided a method of converting electrical energy, into which sunlight has been converted by a plurality of power satellites in space, into microwaves, transmitting the microwaves to an electric power base located on the earth, and generating electric power by means of the electric power base, the method being able to dispersively receive the plurality of microwave beams transmitted from the plurality of power satellites at a number of different positions on a receiving antenna to receive without concentrating the plurality of microwave beams onto the same region of the receiving antenna. Accordingly, the method can prevent a concentration of the energy of microwaves onto part of the receiving antenna, and can therefore prevent the energy density from locally exceeding a legal limit, thus preventing the danger of reduction in the safety of microwave transmission. Furthermore, there is no need to increase the resistance of the receiving antenna to electric power.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of receiving microwave beams from a plurality of power satellites in space by way of a receiving antenna, said method comprising the step of:

by controlling a direction of each of a plurality of microwave beams to be transmitted from said plurality of power satellites, directing the plurality of microwave beams into an aperture surface of said receiving antenna so that the plurality of microwave beams are dispersively received at a number of different positions on the aperture surface of said receiving antenna, so as to level energy distribution of the microwaves received on the aperture surface of said receiving antenna.

2. The method according to claim 1, further comprising the steps of virtually defining a plurality of small regions on the aperture surface of said receiving antenna as the plurality of different positions, and controlling the direction of each of the plurality of microwave beams to be transmitted so that the plurality of microwave beams are directed into said plurality of small regions, respectively.

3. A microwave receiving system comprising:

a plurality of power satellites each for transmitting a microwave beam;

a receiving antenna for receiving a plurality of microwave beams from said plurality of power satellites; and a control means for controlling said plurality of power satellites so that the plurality of microwave beams are dispersively directed into a number of predetermined different positions on an aperture surface of said receiving antenna.

4. The microwave receiving system according to claim 3, wherein said control means controls said plurality of power satellites so that the microwave beam from each of said plurality of power satellites is directed into a corresponding one of the plurality of predetermined different positions on the aperture surface of said receiving antenna.

5. The microwave receiving system according to claim 3, wherein said plurality of predetermined different positions are arranged uniformly on the aperture surface of said receiving antenna.

6. The microwave receiving system according to claim 3, wherein said control means controls the direction of each of the plurality of microwave beams to be transmitted from said plurality of power satellites based on information on the plurality of predetermined different positions on the aperture surface of said receiving antenna.

7. The microwave receiving system according to claim 6, wherein said control means includes a location information transmission means for transmitting the information on the plurality of predetermined different positions on the aperture surface of said receiving antenna, and a beam direction control means for controlling the direction of each of the plurality of microwave beams to be transmitted from said plurality of power satellites based on the information transmitted by said location information transmission means.

8. The microwave receiving system according to claim 3, wherein said plurality of predetermined different positions are a plurality of small regions that are virtually defined on the aperture surface of said receiving antenna, and wherein said control means controls said plurality of power satellites so that the microwave beam from each of said plurality of power satellites is directed into a corresponding one of the plurality of small regions on the aperture surface of said receiving antenna.

9. The microwave receiving system according to claim 8, wherein said control means controls each of said plurality of power satellites so that the microwave beam from each of said plurality of power satellites is directed into a different one of the plurality of small regions on the aperture surface of said receiving antenna.

10. The microwave receiving system according to claim 8, wherein a number of said plurality of power satellites is equal to a number of said plurality of small regions, and said control means controls each of said plurality of power satellites so that the microwave from each of said plurality of power satellites is directed into a different one of the plurality of small regions on the aperture surface of said receiving antenna.

11. The microwave receiving system according to claim 8, wherein said plurality of power satellites is divided into a number of groups, and a number of said plurality of groups is equal to a number of said plurality of small regions, and wherein said control means controls each of said plurality of power satellites so that a microwave beam from each of said plurality of groups is directed into a different one of the plurality of small regions on the aperture surface of said receiving antenna.

12. The microwave receiving system according to claim 8, wherein said plurality of small regions include a plurality of first small regions into which the aperture surface is divided so that they do not overlap one another, and a plurality of second small regions which do not overlap one another and each of which is located at a boundary between first small regions adjacent to each other.

13. The microwave receiving system according to claim 3, wherein said receiving antenna is an array antenna including a plurality of antenna elements arranged in a form of an array.

* * * * *